United States Patent Office 3,655,840
Patented Apr. 11, 1972

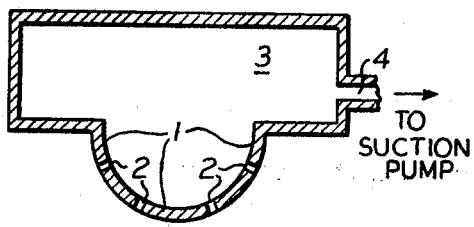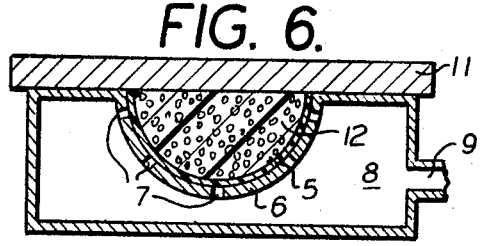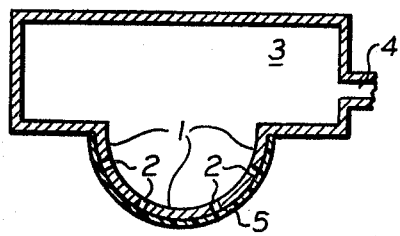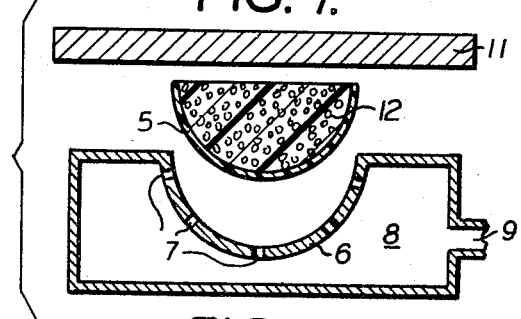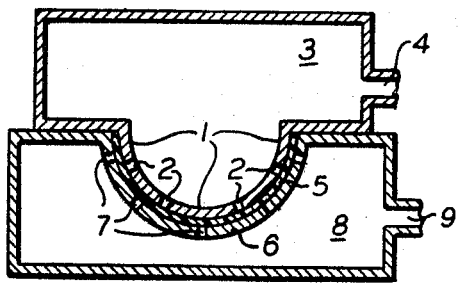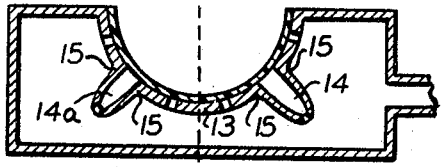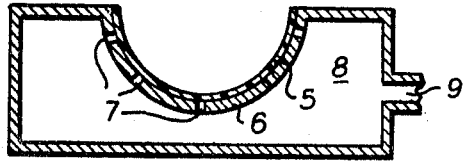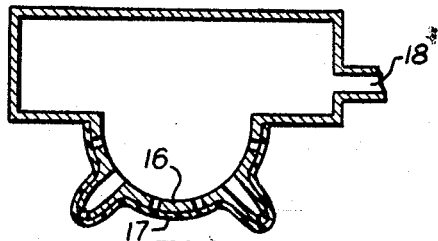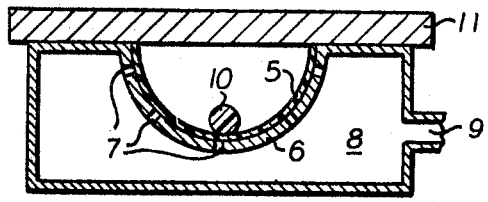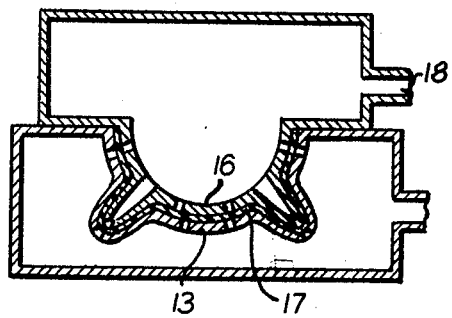

3,655,840
PROCESS FOR THE MANUFACTURE OF FOAM-PLASTIC ARTICLES COVERED WITH A PROTECTIVE FILM
Hans-Dietrich Krug, Heidelberg, Germany, assignor to Carl Freudenberg, Weinheim, Germany
Filed Apr. 28, 1969, Ser. No. 819,855
Claims priority, application Germany, May 28, 1968, P 17 78 717.6
Int. Cl. B29d 9/00, 9/08
U.S. Cl. 264—45                                    5 Claims

ABSTRACT OF THE DISCLOSURE

The improvements in the production of foam-form articles having a film-form member on at least one surface thereof by placing the film-form member in a suitable female mold and permitting foamable material to foam on the film-form member within the mold, whereby filling out the mold and adhering to the film-form material; wherein the film-form material is initially disposed on a male mold form corresponding to the female mold form and is transferred from the male mold form to the female mold form in the desired mold shape, and thereafter the foamable material is permitted to foam on the film-form member within the female mold form.

Many articles, for example sandals or motor vehicle fittings are made from foamed plastics, such as foamed polyurethane or foamed polyvinyl chloride. The surface of the foam-form plastic article may be covered with a smooth film which not only improves the appearance but also prevents pentration of dirt and water into the pores of the foamed plastic.

Several methods of preparing film covered foam plastic articles are well known. Originally such articles were made by sticking a film onto the prepared foam-plastic body using a cement, but more recently foam-form plastic articles have been prepared by placing the film into a mold, introducing a foamable paste onto the film and inducing foaming on the paste by conventional methods. The film adheres to the foam during the foaming.

A problem arises in that it has sometimes been found to be difficult to make the film conform exactly to the the shape of a mold, particularly when the mold is of complex shape. It is known from the Swiss patent specification No. 433,706 to use a mold having suction ducts leading through its walls and to draw the film to the shape of the mold at room temperature by applying suctions through these ducts and thus to draw the film towards the desired shape. A foamable paste is introduced onto the film and the mold closed before foaming is induced.

However, when the mold is large or of complex shape even this method may not result in the film being formed exactly into the desired shape and during the subsequent foaming, the covering film may become creased and may not stick evenly to the whole surface of the foam-form plastic article.

According to this invention, the prior art defects and problems are obviated or at least alleviated by first forming the film into the desired shape on a male form having that desired shape, retain it thereon by suction, and then inserting such male mold into a correspondingly shaped female mold. The film is transferred from the male mold into the female mold and is retained thereon suitably by suction. The male mold is then removed, the foamable paste is introduced into the female mold and, after closing the mold, is foamed therein to fill the mold while the film is still retained in its desired shape by suction. The foam adheres to the film.

By this method much more accurate shaping of the film can be obtained than in the prior art methods mentioned above. Thus it has been found that the film can be fitted much more accurately onto and against a male mold than into and against a corresponding female mold. This is true where the film is shaped and retained by suction and is true for any given equivalent degree of suction applied. It is acknowledged that a sufficiently high degree of suction could be applied through a female mold whereby the film could be drawn into even the most intricate shapes of such mold, but then the film may become over stretched and may even tear in the most intricate and deepest parts. It has been found that it is very much more satisfactory to place the film over a corresponding male mold and draw the film against this mold first since the film can be conformed to the mold with a much lower suction than in the case of a corresponding female mold.

Since the film is held in shape by suction until the mold is filled with foam, it is not necessary to heat the film to shape it and to cause it to retain its shape. It is known to form shaped films by "deep drawing" processes and then to fill these with foam. However, deep drawing involves vacuum drawing at high temperatures and subsequent cooling to set the film in the drawn shape. Films that can be used for such deep drawing are therefore severely limited, whereas these limitations are avoided in the invention. In fact it is generally preferred to use in the invention a film which does not withstand deep drawing, since such films are usually softer than deep drawable films. It is often preferred to use a film that carries some pattern, for example to simulate leather, printed onto or embossed into the film, in order that the foam-form article produced shall have a pleasing appearance. It is preferred to use films of vinyl chloride polymer which films may themselves be foam-form or not, as the case may be. Foam-form films are known materials which can be produced by spreading a foamable paste in a thin layer over a film or onto a suitable substrate, thereby forming a film with a soft feel. It may be reinforced by a thin textile layer embedded in the foam. Suitable film of this type is commercially available.

However, any film that can be shaped on a male mold by suction or otherwise and that will adhere firmly to the foam as a result of the foamable paste foaming in contact with the film can be used. Any convenient foamable paste may be used although preferably it is one that foams at low temperatures, e.g. below 110° C., so as to avoid damaging any temperature sensitive film that is being used. Polyurethane foams are preferred, preferably as such known polyurethanes as are the reaction product of tolylene diisocyanate and an adipic acid-hexane diol (1–6) polyester prepolymer. Other known polyurethane foam-forming materials can similarly be used.

The invention is illustrated in the accompanying drawing in which:

FIGS. 1 through 7 show sequential schematic steps in the process of this invention; and FIGS. 8 through 10 are similar but show a more complex mold shape.

FIG. 1 shows a mole mold 1 of a hemispherical shape and having suction ducts 2 leading to a box 3 to which a vacuum is applied through a pipe 4. As shown in FIG. 2, a film 5 is laid against the male mold 1 and is drawn to it and held to it by suction.

As shown in FIG. 3 the male mold and film thereon are then inserted into a female mold 6 having a corresponding female hemispherical shape. Suction is applied through passages 7 in the mold surface from a box 8 and a pipe 9. Vacuum in the box 3 is then released with the result that the film transfers to the female mold surface. The male mold assembly is then removed as shown in FIG. 4, while still applying vacuum through the pipe line 9.

As shown in FIG. 5, a foamable paste 10 is then deposited on the film 5 and the mold closed with a cover 11. As shown in FIG. 6, foaming is then induced or allowed to proceed with vacuum still being applied through pipe 9. After the mold has been filled with foam and foaming is complete the vacuum is discontinued, the mold opened and the finished article 12 removed as shown in FIG. 7.

The male and female molds shown in the FIGS. 1–7 of the drawing have been kept simple for illustrative purposes. More usually the male mold will not have such a simple convex shape, and the female mold a simple concave shape. Usually they have a more complex shape. A female mold 13 of a complex shape is shown in FIG. 8. In this shape there are two deep indentations 14 and 14a in the mold surface and the film must lay evenly in these without any serious stretching. At the corners 15 the film may stretch very slightly. A corresponding male mold 16 is shown in FIG. 9. According to this invention the the film 17 is stretched over the male mold 16 and held there by vacuum through pipe 18. The male mold 16 and female mold 13 are mated in FIG. 10 with the film 17 therebetween. It has been found that part of the female mold may advantageously be made of an elastic material. Preferably the male mold is of an elastic material, since it can then be forced into the female mold under compression so as to ensure very accurate shaping of the film between the molds. It is also possible to insert a rigid male mold into an elastic female mold or vice versa, but it is more difficult to carry this into practice.

The female mold in which the foaming takes place, may be of multipart construction. If, for example, the female mold shown in FIG. 8 is divided into two equal parts then the mold can be assembled against the male mold of FIG. 9 in two separate parts and can subsequently be dismantled in stages. This method can considerably facilitate the transfer of the film from male to female molds when complicated shaped foam plastic bodies are to be manufactured, and also would facilitate the removal of the foamed bodies from the female mold cavity.

The invention is of value for making articles of simple or very complex shapes. For example, it may be used for making protective pads for cars, e.g., shaped padded dashboards or shoe inner soles, etc.

What is claimed is:

1. In the process of producing a composite foam-form article having a film-form surface by disposing a polyvinyl chloride film in a female mold, conforming said film to the contours of said female mold, depositing foamable polyurethane material on said film in said mold and permitting said foamable material to foam whereby filling out said mold form and adhering to said film; the improvement whereby permitting the use of a non-deep drawable polyvinyl chloride film as said film and permitting the process to operate without heating said non-deep drawable film, which comprises positioning said non-deep drawable film on a male mold form corresponding to said female mold form, conforming said film to the contours of said male mold form without heating by means of suction through said male mold form, disposing said male mold with said non-deep drawable film thereon in said female mold and transferring said non-deep drawable film form said male mold form into said female mold form, maintaining said film in the contour of said female mold for mby suction through said female mold form without heating, depositing said foamable material into said female mold on said non-deep drawable film and foaming said foamable material as aforesaid.

2. The improved process claimed in claim 1, wherein said film is itself at least partially foam-form.

3. The improved process claimed in claim 1, wherein said male and female molds are at least partially elastomeric.

4. The improved process claimed in claim 1 wherein at least one of said male and female molds is a multipart mold.

5. The improved process claimed in claim 1, wherein said film has a pattern thereon both before and after molding.

References Cited
UNITED STATES PATENTS

| 2,973,558 | 3/1961 | Stratton, Jr. | 264—92 |
| 3,291,874 | 12/1966 | Negoro | 264—92 |
| 3,390,214 | 6/1968 | Woods | 264—45 |
| 3,472,809 | 10/1969 | Hardman | 264—225 |

JULIUS FROME, Primary Examiner

L. GARRETT, Assistant Examiner

U.S. Cl. X.R.

264—54, 90, 225